(12) United States Patent
Snyder

(10) Patent No.: US 6,656,254 B1
(45) Date of Patent: Dec. 2, 2003

(54) FULL FLOW MECHANICAL FAILSAFE

(75) Inventor: Todd R. Snyder, Birmingham, AL (US)

(73) Assignee: Southern Research Institute, Birmingham, AL (US)

(*) Notice: Subject to any disclaimer, the term of this patent is extended or adjusted under 35 U.S.C. 154(b) by 0 days.

(21) Appl. No.: 10/070,811

(22) PCT Filed: Sep. 13, 2000

(86) PCT No.: PCT/US00/24960

§ 371 (c)(1), (2), (4) Date: Jun. 25, 2002

(87) PCT Pub. No.: WO01/19494

PCT Pub. Date: Mar. 22, 2001

Related U.S. Application Data

(60) Provisional application No. 60/153,223, filed on Sep. 13, 1999.

(51) Int. Cl.[7] .............................................. B01D 46/42
(52) U.S. Cl. ........................... 96/399; 96/400; 137/460; 137/498; 210/100
(58) Field of Search ..................... 96/339, 400; 55/309, 55/310, 311, 417; 95/22; 210/100; 137/459, 460, 498

(56) References Cited

U.S. PATENT DOCUMENTS

| | | | |
|---|---|---|---|
| 2,687,745 A | | 8/1954 | Hackett |
| 3,478,881 A | * | 11/1969 | Bozek |
| 3,712,030 A | * | 1/1973 | Priest |
| 4,026,685 A | * | 5/1977 | Grix |
| 4,071,038 A | * | 1/1978 | Robinson |
| 4,297,113 A | | 10/1981 | Theodore |
| 4,356,007 A | * | 10/1982 | Bowman |
| 4,373,548 A | * | 2/1983 | Chou |
| 4,485,011 A | * | 11/1984 | Cole et al. |
| 4,707,165 A | * | 11/1987 | Tauber et al. |
| 5,248,414 A | * | 9/1993 | Perkins |
| 5,348,572 A | | 9/1994 | Jelich et al. |
| 5,503,661 A | | 4/1996 | Brännström |
| 6,428,708 B1 | * | 8/2002 | Halemba et al. |
| 2002/0129853 A1 | * | 9/2002 | Snyder |

FOREIGN PATENT DOCUMENTS

| | | |
|---|---|---|
| DE | 146 477 | 12/1903 |
| DE | 25 47 470 A | 4/1977 |

* cited by examiner

Primary Examiner—Duane S. Smith
(74) Attorney, Agent, or Firm—Rothwell, Figg, Ernst & Manbeck

(57) ABSTRACT

A full-flow mechanical failsafe (100) is composed of a cylindrical shell (101) having a movable sealing plug (105) therein, for attachment to a filter element (110) of a fluid filtering system, such as a gas clean up system in a power plant. The sealing plug (105) rests on locking spheres (107) within the shell (101) during normal operation. Upon filter failure or breakage, the flow fluid will be substantially increased, causing an increase in upward pressure against the sealing plug (105), forcing it upward off the spheres (107) and into sealing contact with a flow aperture (102, 103), shutting off fluid flow. The spheres (107) move downward into a locking position upon movement of the sealing plug (105), to secure the sealing plug (105) in its upward sealing position. The failsafe (100) can be used in fluid flow control systems other than fluid filtering systems, such as oil or gas pipelines, and can be used to prevent improper reverse fluid flow.

23 Claims, 5 Drawing Sheets

FULL FLOW MECHANICAL FAILSAFE

This application claims the benefit of provisional application Ser. No. 60/153,223 filed Sep. 13, 1999.

BACKGROUND OF THE INVENTION

1. Field of the Invention

This invention relates generally to fluid flow control systems, and to mechanical failsafes or shut-off devices for preventing the flow of fluids (e.g., gas or liquid streams) upon breakage or failure of components in the system, such as filters or other components. More particularly, the invention relates to devices for preventing the flow of high-temperature (e.g., up to 1800° F.) gas streams upon filter damage.

2. Description of Background Art

Industrial systems in which fluids flow (such as gas turbine power plants, liquid fuel processing plants, hydraulic systems, pneumatic systems and the like), and in which gases are usually cleansed of entrained particulate matter or treated prior to coming into contact with system components that are susceptible to such particulate matter, usually provide filtration for removing impurities and/or restricting flow to system design levels. To prevent damage to system components and/or the environment, such systems often are provided with flow limiting or shut-off valve mechanisms. Upon the occurrence of damage, breakage or removal of filter components, these shut-off mechanisms stop the flow of fluid through the system.

In particular, high temperature and high pressure barrier filter systems are critical to the successful commercialization of PFBC and IGCC coal-based power plant systems. Presently the most commercially ready barrier filter systems are based on candle filter technology. These barrier filter systems generally employ a large number of individual, porous candle filter elements in parallel.

Pilot-scale candle filter-based systems have been shown to remove particulate matter down to a concentration of less than 1 ppm (part per million) when in good operating condition. However, in the event of the failure of even a single filter element, the filter system outlet dust loading will increase and thereby potentially damage gas turbine blades, contaminate other downstream processes, and limit the availability of the power system. A filter failure safeguard device which would prevent the flow of particle-laden gas through the failed filter element location would serve to minimize the potential damage to downstream equipment, minimize dust emissions, and allow the power plant to continue operation until a convenient or scheduled outage can be implemented.

Various types of flow limiting/shut-off mechanisms are known in the prior art, see e.g., U.S. Pat. Nos. 5,242,581; 3,261,146; 2,892,512; 2,833,117; 2,687,745; 2,680,451; 2,635,629; 1,983,791. Such mechanisms are characterized by their complicated structure, large number of moving parts, difficulty in installation, limited operational temperature ranges, and/or dependence on entrained particle concentration for activation of the shut-off feature.

There remains a need in the art for improvement to the structure of mechanical fluid flow shut-off devices.

SUMMARY OF THE INVENTION

The present invention provides an improvement to the prior art, by providing according to one embodiment a full-flow failsafe, including a filter element for filtering entrained particles from a flowing fluid stream, a shell having apertures at each end thereof for enabling the fluid stream to flow therethrough, a first one of the apertures being coupled to the filter element, a sealing plug movably positioned within the shell, the sealing plug being oriented in a first position during normal operation of the filter element to permit fluid flow through the shell, and, upon failure or breakage of the filter element, being moved by increased fluid velocity to a second position wherein the sealing plug forms a sealing contact with a second one of the apertures, and a locking mechanism supporting the sealing plug in the first position, and being moved to a locking position for securing the sealing plug in the second position in response to the movement of the sealing plug.

BRIEF DESCRIPTION OF THE DRAWINGS

The present invention can be more fully understood from the detailed description given below in conjunction with the accompanying drawings. These are provided by way of illustration only and are not intended as limiting the present invention, and wherein.

DETAILED DESCRIPTION OF THE PREFERRED EMBODIMENT

Figure 1:
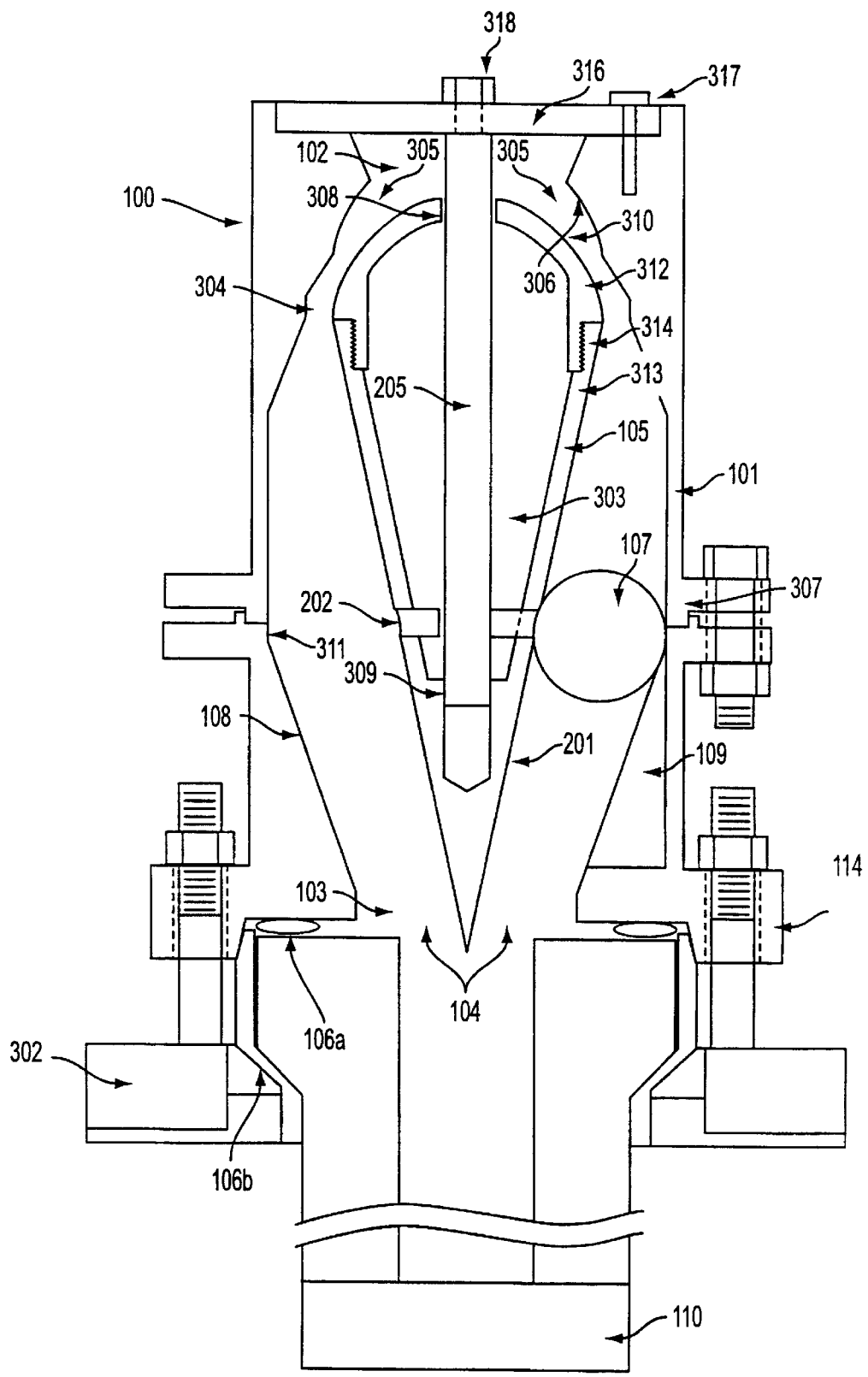
FIG. 1 is a cross-sectional diagram of a full-flow mechanical failsafe 100 according to a preferred embodiment of the invention, in an inactive mode of operation (allowing normal fluid flow)

Referring to FIG. 1, the full-flow mechanical failsafe according to one embodiment of the present invention is particularly adapted for candle filter systems including candle filters 110. Such candle filter systems would be used, for example, in power plants for removing dust and other solid particle pollutants or contaminants from gases at temperatures up to approximately 1650° F. flowing through various stages of the power plant equipment.

There are two primary causes for dust to reach the clean side of candle-based filter systems. The first is the existence of small leaks around filter element gaskets or seals resulting from faulty gasket components or improper installation. In such an instance the flow path of dust-laden gas leaking across the tubesheet 302 would bypass the candle filter element 110 and its safeguard device. The only remedy for a failure of this type is prevention through quality control of gasket materials and installation procedures.

The second cause is the case wherein solid particles breach the tubesheet 302 as a result of catastrophic failure or breakage of one or more candle filter elements 110. Failures of this type have been experienced at many pilot- and demonstration-scale Hot Gas Cleanup (HGCU) filter systems, and present the primary challenge for system reliability that is addressed by the present invention.

The mechanical failsafe device 100 according to one preferred embodiment of the present invention includes a cylindrical shell 101, about 3 inches in diameter and about 4 to 5 inches in height. Apertures 102 and 103 are centered at the top and bottom of the shell 101, and allow filtered flue gas to flow upward through the device in a flow direction indicated by arrows 104 during normal operation, and pulse cleaning gas to flow downward through the device in an opposite direction, when an intact and operational filter element 110 is connected to the failsafe.

Figure 3:
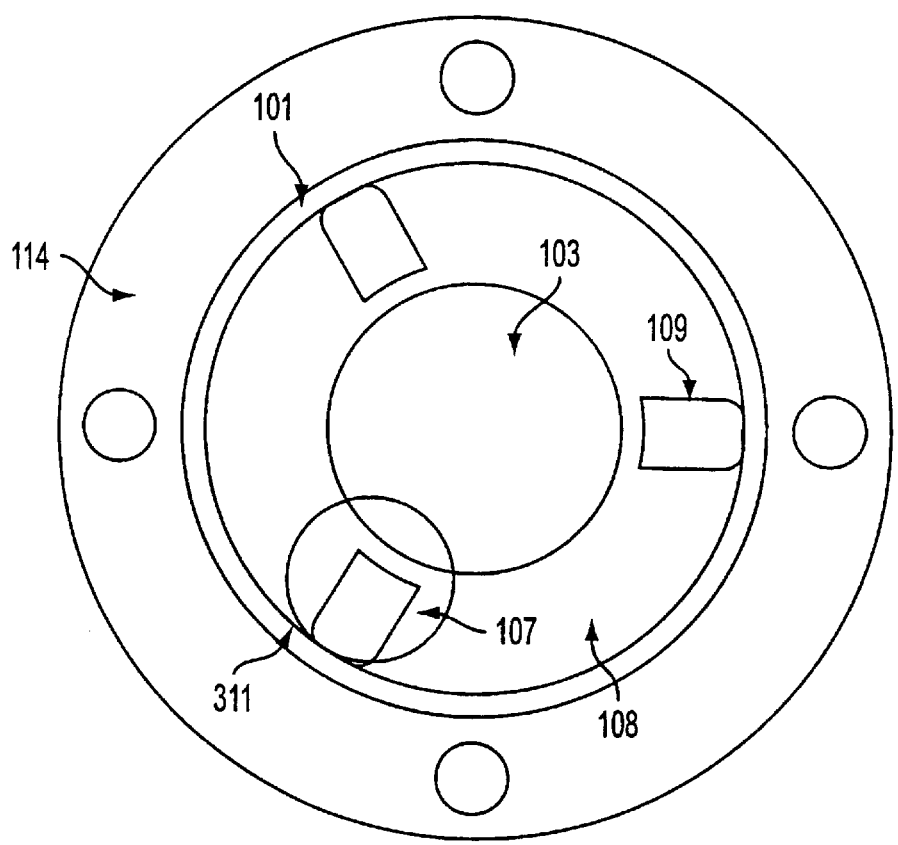
FIG. 3 is a top view of the sloped bottom surface of the failsafe shell, showing the presence of grooves 109 for locking spheres 107 (only one of which is shown)

A sealing plug 105 is provided in the interior of the cylindrical shell 101. Sealing plug 105 is essentially in the shape of a hemisphere joined on its lower flat surface to the flat surface of a cone of equal diameter to the hemisphere. The sealing plug 105 is supported in the shell by three locking spheres 107, (only one of which is shown for simplicity) preferably positioned 120° from each other around the conical portion of the sealing plug. The spheres rest in grooves or channels 109 in a conical surface 108 in the shell interior, and also contact inner angled surface 311 of the shell 101. As shown in FIG. 3, the grooves 109 are cut into the surfaces 108 under the spheres 107 to guide their movement when the mechanical failsafe is activated, as explained further below. Additionally, as shown in FIG. 4, a continuous indentation 202 is formed around the circumference of the lower surface 201 of the sealing plug, at a position where the indentation 202 contacts the spheres as shown in FIG. 1, to assist in holding the sealing plug in the inactive position during the occurrence of vibrations that may be experienced in the filter vessel during installation and normal operation.

The diameter of the spheres 107, the dimensions of the shell 101, the sealing plug 105, the conical surfaces 108 and 201, the apertures 102, 103 and the annular gap 304 between the inner surface of the shell 101 and the sealing plug 105 at its widest dimension are designed such that, with the normal flowrate of filtered gas upward through the failsafe, the upward pressure on the sealing plug 105 will not be sufficient to cause the sealing plug 105 to be lifted from its resting position on the spheres 107 when the filter element 110 is intact. The weight of the sealing plug 105 can be selected during design by adjusting the size of the internal volume 303, or in other words a portion of the interior of the sealing plug may be solid to establish the optimum weight to ensure the proper stability of the plug on the spheres during normal operation for the particular flow parameters of the system on which it is installed.

Figure 2:
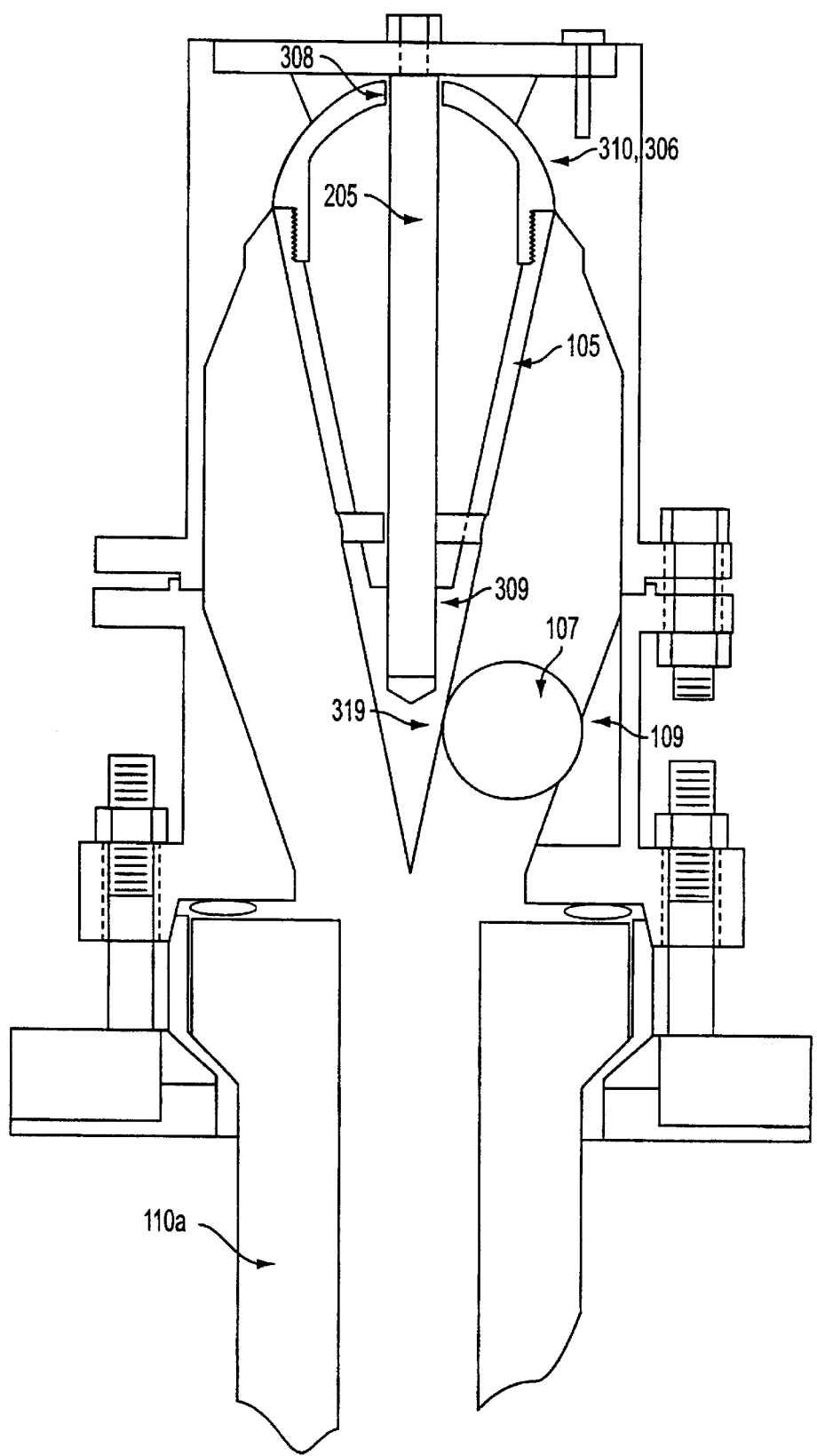
FIG. 2 is a cross-sectional diagram of full-flow mechanical failsafe according to the invention in an active mode of operation, which prevents the flow of fluid through a damaged filter element 301.
Figures 4A, 4B:
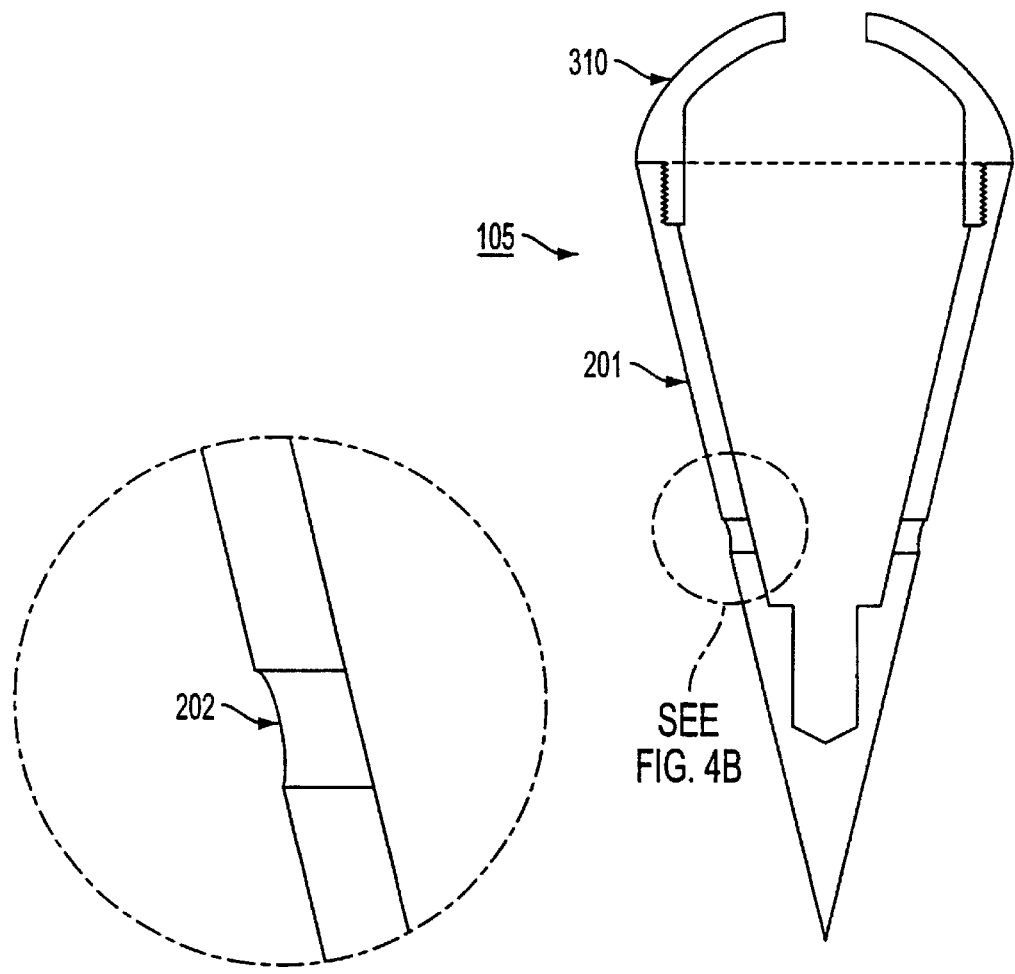
FIG. 4 is a side view of sealing plug 105 with a hemispherical sealing surface 310, with an enlarged sectional view of conical surface 201 showing the presence of a concave indentation 202 for maintaining locking spheres 107 in place in the inactive mode.

In the preferred embodiment as shown in FIGS. 1, 2 and 4, the hemispherical portion 312 of the plug is provided as a piece separate from the conical portion 313. This allows the amount of internal volume 303 to be selected at the manufacturing stage, either by manufacturing conical portions 313 of varying internal volume, or by filling the internal volume 303 with an appropriate amount of a suitable material for adjusting the weight of the sealing plug 105. The two pieces 310 and 313 are then joined together. As shown in FIG. 1, a threaded connection 314 may be provided for this purpose; other joining methods may be used equivalently. The weight of the sealing plug also is determined by the degree that the upward flow must increase (as would occur in a failure) in order to lift the sealing plug and activate the failsafe (as shown in FIG. 2). For a specific barrier filter installation application as shown in FIG. 1, the weight of the sealing plug and the dimension of the gap 304 are set so that only the flowrate encountered in a failure of the filter element will be sufficient to lift the sealing plug enough to activate the failsafe device.

As shown in FIG. 1 the failsafe 100 is attached to the tubesheet 302 with the aid of a mounting bracket or flange 114. Other attachment mechanisms may be used, depending on the tubesheet design. A gasket 106a is provided between the failsafe and the filter, and an additional gasket 106b may be provided between the filter element 110 and the tubesheet 302. Gaskets 106a and 106b may be made of Nextel® or similar material.

The shell 101 may be constructed from two separate pieces, joined together at flange 307 or by other equivalent joining means, to enable installation and removal of the sealing plug and locking spheres.

The apertures 102, 103 and the annular gap 304 should be sized such that sufficient flow paths are maintained within the failsafe for the passage of filtered flue gas and pulse cleaning gas to minimize the addition of flow resistance to the system by the failsafe during either filtering or pulse cleaning operations.

In the inactive (e.g., normal) mode of operation, the upward flow 104 of filtered flue gas provides an increased pressure in the lower portion of the failsafe 100, having a magnitude determined by the velocity v and the density $\mu$ of the gas according to Bernoulli's term $\frac{1}{2} \rho^2$. A large proportion of this pressure will be dissipated across the annular gap 304. Constrictions in the annular gap act as an annular orifice for gas flow; the smaller this annular orifice, the more pressure is dissipated as the gas passes through it.

During application of reverse gas pulses used to clean the filter elements, or in other cases where download flow is the normal flow direction, the downward pressure exerted on the plug by the flow 305 from such pulses, or flow, is transferred through the spheres 107 to the inner wall 311 and the sloped inner surface 108 of the shell.

When the filter element 301 breaks, as shown in FIG. 2, two conditions change in the vicinity of the mechanical failsafe 100. The first is that the upward velocity of the gas through the remaining part of the broken filter element and the mechanical failsafe increases very rapidly, driven by the tubesheet pressure drop (not shown) at the time of breakage. The second is that particle-laden or unfiltered or untreated gas advances from the point of breakage of the filter element 301 towards the top of the candle filter element and the mechanical failsafe 100. Because the failsafe desirably is activated almost instantaneously in response to the rapid increase of upward gas velocity experienced in a filter element failure, little or no particle-laden gas or untreated gas is expected to exit the top of the failsafe before the failsafe is fully activated and the flow of gas is shut off.

In the event of filter element breakage, the increased gas velocity through the mechanical failsafe 100 creates a significantly higher pressure drop across the annular orifices around the sealing plug, thereby significantly increasing the upward pressure on the sealing plug itself. The degree to which the velocity of the gas entering the mechanical failsafe will be increased upon the breakage of a filter element is primarily dependent upon the tubesheet pressure drop and the dimensions of the portion of the broken filter element that remains attached to the tubesheet. Calculations have indicated that, following the breakage of a filter element, the velocity of gas through the mechanical failsafe could be increased by a factor of 10 or more (with the concomitant increase of upward pressure on the sealing plug increasing by a factor of 100 or more).

Upon the occurrence of a sufficiently higher pressure drop across the annular orifice around the sealing plug, as would happen upon the breakage of a filter element 301, the increased upward gas pressure on the sealing plug will lift the sealing plug up from its resting position on the spheres. The plug will continue to move upward until it contacts the upper sealing surface 306 around the upper aperture 102, as shown in FIG. 2. The diameter of this upper sealing surface is made equal to the diameter of the hemispherical surface of the sealing plug, so that a high-quality seal will be formed when these two surfaces contact each other in the activated mode as shown in FIG. 2.

As shown in FIG. 1, the interior of the shell 101 can be shaped such that the pressure across the annular orifice adjacent to the widest portion of the sealing plug would increase as the plug travels upward by making the annular gap smaller as the plug nears the sealing surface 306 at the top of the shell 101.

Once the sealing plug reaches the top of the shell and fully contacts the sealing surface 306, the gas flow is completely blocked and the upward force is reduced to zero. Just before this time, the spheres 107 begin to roll down the inclined surface 108 in a straight direction aided by the grooves 109, as shown in FIG. 2, until the spheres become pinched in position at the bottom of the sealing plug 105 at location 319, between the plug and the grooves 109 in the inclined surface of the shell. In this regard the dimensions of the spheres, shell and sealing plug are designed to prevent the spheres from falling down through the aperture 103 at the bottom of the shell (see FIG. 1). When the spheres reach their final position as shown in FIG. 2, they serve as locks securing the sealing plug against the sealing surface 306 of the upper aperture 102 of the shell, to thereby prevent the flow of dust and/or untreated gas past the failsafe, and also to prevent the sealing plug from being forced back down into the shell by the pressure from reverse flow gas cleaning pulses.

Figure 5:
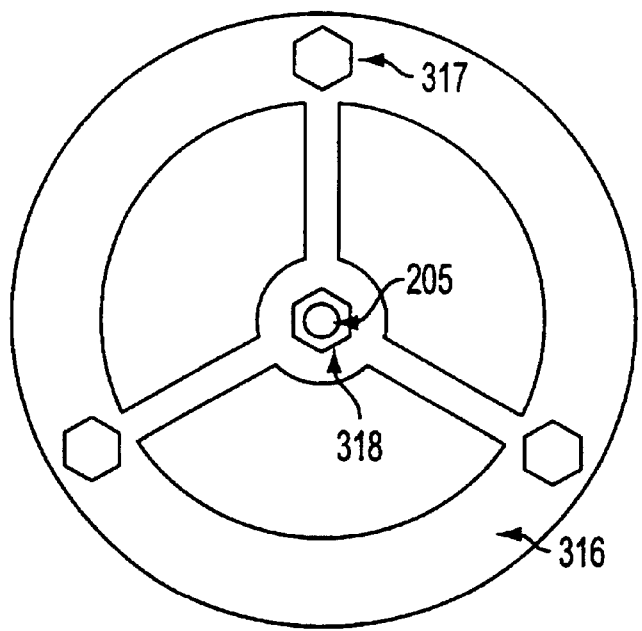
FIG. 5 is a top view of frame 316 which secures alignment pin 205 to the shell 101 and establishes proper positioning of the alignment pin.

As shown in FIG. 2, an optional axial alignment pin 205 may be attached to the top of the shell and extends into the body of the sealing plug through a close tolerance guide hole 308 and through the body into a second guide hole 309. As shown in FIG. 5, the alignment pin may be attached to the top of the shell with a frame 316 through a threaded connection 318. The frame 316 may be attached to the shell with screws 317. The alignment pin alternatively may be attached to the sealing plug and extend through guide holes in the shell. The alignment pin 205 assists in the proper seating of the sealing plug against the sealing surface 306 of the shell.

Further, during installation in the filter vessel, a small amount of paraffin may be used to hold the sealing plug and spheres in their proper positions within the shell by application to the contacting surfaces of the spheres. The paraffin would melt and burn off as the filter system is preheated during a system startup process. Reapplication of paraffin would be unnecessary except where a failsafe had to be removed, reconditioned and reinstalled after activation by the failure of its filter element.

The full-flow mechanical failsafe of the present invention provides several advantages over failsafe devices that make use of entrained particles in the flowing gas to form a seal. The formation of a seal by using such entrained particles takes place gradually, whereas the mechanical failsafe of the invention shuts off the flow of particle-laden gas almost immediately upon filter breakage. The effectiveness of the mechanical failsafe is thus independent of particle concentration. Further, seals that depend on plugging of flow paths by entrained particles can be compromised by the application of periodic reverse flow cleaning gas pulses. In contrast, the failsafe of the present invention provides a positive seal against the force exerted by such cleaning pulses. In the event a failure occurs during application of a cleaning pulse, the failsafe will be activated as soon as the normal fluid flow direction is reestablished.

Reconditioning of activated failsafes is fairly simple. All components are preferably made of suitable material (such as 310 SS steel, which is well suited to HGCU filter applications) which can be washed, dried, reconfigured in an inactive mode, and reinstalled.

The basic principles of the full-flow mechanical failsafe may be adapted in alternate embodiments for applications other than HGCU particle filtration. For example, similar devices of much larger scale may be used in an oil or gas pipeline. The failsafe devices would be positioned at periodic intervals along such pipelines, in short vertical runs where the flow direction is upward. In the event of pipeline failure, the fluid flow would increase most immediately upstream from the failsafe device, activating it and shutting off the flow, thus minimizing fluid loss as well as potential safety and environmental hazards.

Another alternate embodiment of the invention could be configured such that even a small upward flow of fluid would activate the device. This embodiment would be useful to prevent backward flow in a system where the normal fluid flow direction was downward.

The invention having been thus described, it be apparent to those skilled in the art that the same may be varied in many ways without departing from the spirit and scope of the invention. Accordingly, any and all such modifications are intended to be covered by the following claims.

What is claimed is:

1. A full-flow failsafe, comprising:
    a filter element for filtering entrained particles from a flowing fluid stream;
    a shell having apertures at each end thereof for enabling said fluid stream to flow therethrough, a first one of said apertures being coupled to said filter element;
    a sealing plug movably positioned within said shell, said sealing plug being oriented in a first position during normal operation of said filter element to permit fluid flow through said shell, and being moved by increased fluid velocity to a second position wherein said sealing plug forms a sealing contact with a second one of said apertures, upon failure or breakage of said filter element; and
    at least one locking mechanism supporting said sealing plug in said first position, and being moved to a locking position for securing said sealing plug in said second position in response to said movement of said sealing plug.

2. A full-flow failsafe as set forth in claim 1, wherein said locking mechanism comprises a sphere.

3. A full-flow failsafe as set forth in claim 2, wherein a bottom interior surface of said shell is sloped, and said sphere rolls downward between said sealing plug and said sloped surface to a locking position locking said sealing plug in sealing contact with said second aperture upon said movement of said sealing plug.

4. A full-flow failsafe as set forth in claim 3, further comprising two additional spheres located around a bottom surface of said sealing plug.

5. A full-flow failsafe as set forth in claim 3, further comprising a groove cut into said sloping surface to guide movement of said sphere.

6. A full-flow failsafe as set forth in claim 3, further comprising an indentation in a surface of said sealing plug contacting said sphere, to hold said sphere in place during normal operating conditions of said filter element.

7. A full-flow failsafe as set forth in claim 1, further comprising an alignment pin mounted on said shell to maintain alignment of sealing plug with respect to said second aperture upon movement of said plug into contact with said second aperture.

8. A full-flow failsafe as set forth in claim 1, wherein the interior of said shell is dimensioned to cause upward pressure against said sealing plug to increase as said sealing plug advances toward said second aperture upon filter failure or breakage.

9. A full-flow failsafe as set forth in claim 1, further comprising a sealing gasket mounted within said second aperture.

10. A full-flow failsafe as set forth in claim 1, wherein said fluid is a gas.

11. A full-flow failsafe as set forth in claim 1, wherein said filter element is a candle filter.

12. A full-flow failsafe for a fluid flow system, comprising:
- a shell having apertures at each end thereof for enabling a fluid stream to flow therethrough, a first one of said apertures admitting a fluid stream into the failsafe, and a second one of said apertures allowing said fluid stream to exit said failsafe;
- a sealing plug movably positioned within said shell, said sealing plug being oriented in a first position during normal fluid flow of said system to permit fluid flow through said shell, and being moved by increased fluid velocity to a second position wherein said sealing plug forms a sealing contact with said second one of said apertures, said increased fluid velocity being of a magnitude indicative of improper operation of said system; and
- at least one locking mechanism supporting said sealing plug in said first position, and being moved to a locking position for securing said sealing plug in said second position in response to said movement of said sealing plug.

13. A full-flow failsafe as set forth in claim 12, wherein said locking mechanism comprises a sphere.

14. A full-flow failsafe as set forth in claim 13, wherein a bottom interior surface of said shell is sloped, and said sphere rolls downward between said sealing plug and said sloped surface to a locking position locking said sealing plug in sealing contact with said second aperture upon movement of said sealing plug.

15. A full-flow failsafe as set forth in claim 14, further comprising two additional spheres located around a bottom surface of said sealing plug.

16. A full-flow failsafe as set forth in claim 14, further comprising a groove cut into said sloping surface to guide movement of said sphere.

17. A full-flow failsafe as set forth in claim 14, further comprising an indentation in a surface of said sealing plug contacting said sphere, to hold said sphere in place during normal operating conditions of said fluid flow system.

18. A full-flow failsafe as set forth in claim 12, further comprising an alignment pin mounted on said shell to maintain alignment of sealing plug with respect to said second aperture upon movement of said plug into contact with said second aperture.

19. A full-flow failsafe as set forth in claim 12, wherein the interior of said shell is dimensioned to cause upward pressure against said sealing plug to increase as said sealing plug advances toward said second aperture upon abnormal increased fluid flow.

20. A full-flow failsafe as set forth in claim 12, wherein said fluid is a gas.

21. A full-flow failsafe as set forth in claim 12, wherein said fluid is a liquid.

22. A full-flow failsafe as set forth in claim 1, wherein said sealing plug includes a sloped surface on a lower portion thereof.

23. A full-flow failsafe as set forth in claim 12, wherein said sealing plug includes a sloped surface on a lower portion thereof.

* * * * *